United States Patent

Matsumoto

Patent Number: 5,131,583
Date of Patent: Jul. 21, 1992

[54] METHOD OF MANUFACTURING HIGH PRESSURE FLUID SUPPLY PIPE

[76] Inventor: Takeshi Matsumoto, 3-17, Nishiki-cho, Numazu City, Shizuoka Prefecture, Japan

[21] Appl. No.: 566,605

[22] Filed: Aug. 10, 1990

[30] Foreign Application Priority Data

Aug. 17, 1989 [JP] Japan ................... 1-211993

[51] Int. Cl.⁵ .............................. B23K 31/00
[52] U.S. Cl. ........................ 228/132; 228/127
[58] Field of Search ............ 228/127, 132, 133; 29/447

[56] References Cited

U.S. PATENT DOCUMENTS

| 930,927 | 8/1909 | Berkstresser | 228/132 |
|---|---|---|---|
| 2,371,348 | 3/1945 | Murray | 228/132 |
| 3,064,344 | 11/1962 | Arne | 29/447 |
| 3,101,531 | 8/1963 | Roseberry | 228/132 |
| 3,762,032 | 10/1973 | Bowling et al. | 228/127 |
| 4,028,785 | 6/1977 | Jackson | 228/133 |
| 4,598,857 | 7/1986 | Matsui | 228/132 |
| 4,694,864 | 9/1987 | Libin | 228/132 |
| 4,784,311 | 11/1988 | Sugao | 228/155 |

FOREIGN PATENT DOCUMENTS

| 1094459 | 8/1976 | Japan | 228/132 |
|---|---|---|---|
| 0517437 | 12/1976 | U.S.S.R. | 228/131 |

OTHER PUBLICATIONS

*Machinery's Handbook*, Twenty-first Edition, first printing 1979, Industrial Press, Inc. Properties of Metals, p. 2270.

Primary Examiner—Kurt Rowan
Assistant Examiner—James Miner

[57] ABSTRACT

A method of manufacturing a high pressure fluid supply pipe of a double pipe structure in which an outer pipe is tightly fit over the outer circumference of an inner pipe, wherein the method comprises a step of forming a double pipe by tightly fitting an inner pipe with an outer pipe having a thermal expansion coefficient greater than that of the inner pipe while putting a brazing material therebetween, and a step of subjecting the double pipe to a heat treatment and then to a gradual cooling treatment to join and tightly fit the inner pipe and the outer pipe integrally to each other, thereby providing at least the inner surface of the inner pipe with a compressive residual stress. The resistance to high inner pressure can be improved and destructive strength, in particular, fatigue resistance to the repeated inner pressure can remarkably be improved.

8 Claims, 2 Drawing Sheets

DISTANCE FROM INNER SURFACE (mm)

THEORETICAL VALUE OF STRESS DISTRIBUTION
CALCULATED UPON APPLYING 1000Kgf/cm$^2$ OF INNER PRESSURE

DISTANCE FROM INNER SURFACE (mm)

METHOD OF MANUFACTURING HIGH PRESSURE FLUID SUPPLY PIPE

BACKGROUND OF THE INVENTION

1. Field of the Invention

The present invention concerns a high pressure fluid supply pipe used in pipelines for supplying high pressure fluid such as fuel supply pipes for diesel internal combustion engines or hydraulic pipelines for hydraulic apparatus and, more in particular, it relates to a method of manufacturing a high pressure fluid supply pipe having resistivity to high inner pressure, in particular, capable of remarkably improving the wear resistance to repeated inner pressure by providing a compressive residual stress to the inner surface of the pipe.

2. Description of the Prior Art

For manufacturing high pressure pipelines for supplying a high pressure fluid such as fuel supply pipes in diesel internal combustion engines or supply pipes for hydraulic oils in hydraulic apparatus, products of a required size have been obtained by reducing the diameter of a carbon steel pipe defined as a carbon steel pipe for high pressure pipelines in JIS G 3455 (STS steel pipe) into a required pipe diameter by means of cold drawing. However, since the thus manufactured pipe is poor in the strength for high inner pressure, in particular, in the fatigue resistance against repeated high pressure, it has been adopted such a means of increasing the pressure resistant strength by replacing STS 38 steel pipes with STS 42 steel pipes or replacing STS steel pipes with SUS steel pipes having higher yielding point and tensile strength, or improving the strength only near the inner circumferential surface by means of soft gas nitrization or carburization since the stress caused by the inner pressure of the pipe reaches maximum at the inner surface.

However, since means for replacing the pipe material with that of higher strength increases the yielding point and the tensile strength of the entire pipe, it involves a problem that the bending fabrication for forming a shape of a product is difficult and, further, the material cost is increased. On the other hand, means of strengthening the inner surface requires an expensive cost for the treatment of the inner surface of the pipe, as well as it hardens to embrittle the inner surface of the pipe making it inappropriate for the molding fabrication after the strengthening treatment for the inner surface. Thus, it requires a strengthening treatment for the inner surface after shaping into a predetermined shape as a product. In this treatment, deformation is caused due to the high temperature treatment and it is difficult to recover a correct original shape, which brings about excessive stresses upon mounting to a place for use such as in an internal combustion engine to possibly cause cracks in the hardened layer.

SUMMARY OF THE INVENTION

For overcoming the foregoing problems and attaining the foregoing object, the present inventor has made expensive studies and accomplished the present invention based on the finding that the foregoing object can be attained by using an outer pipe, which is tightly fit over the outer circumference of an inner pipe, made of such a material as having a greater thermal expansion coefficient than that of the inner pipe, preparing a double pipe in which the inner pipe and the outer pipe are tightly fit to each other by means of brazing material put therebetween and heating and gradually cooling them, thereby providing at least the inner surface of the inner pipe with a compressive residual stress.

That is, the present invention provides a method of manufacturing a high pressure fluid supply pipe of a double pipe structure in which an outer pipe is tightly fit over the outer circumference of an inner pipe, wherein the method comprises preparing a double pipe by tightly fitting the inner pipe with the outer pipe having a thermal expansion coefficient greater than that of the inner pipe while putting a brazing material present therebetween, subjecting the double pipe to a heat treatment and then to a gradual cooling treatment to join and tightly fit the inner and the outer pipes integrally, thereby providing at least the inner surface of the inner pipe with a compressive residual stress.

DETAILED DESCRIPTION OF THE INVENTION

In the combination of the outer pipe and the inner pipe in the present invention, an outer pipe made of a material having a thermal expansion coefficient greater than that of the inner pipe is used. The combination comprises, for example, low carbon steel and high carbon steel, ferrite type stainless steel and high carbon steel or aluminum and copper. The combination is not always restricted only to the above, but any of combinations of an inner pipe and an outer pipe may be used to obtain similar effect so long as the outer pipe is made of a material having thermal expansion coefficient greater than that of the inner pipe. The ratio of the wall thickness between the inner pipe and the outer pipe is selected depending on the materials combined and the degree of the residual stress to be obtained. If the wall thickness of the inner pipe is greater than that of the outer pipe, the residual tensile stress in the outer pipe is greater as compared with the residual compressive stress formed in the inner pipe. On the other hand, if the wall thickness of the inner pipe is extremely reduced, the compressive stress exceeds the yielding point and the resultant residual compressive stress is much lower than the expected value thereby reducing the effect. Accordingly, a preference ratio of the wall thickness between the inner pipe and the outer pipe is generally within a range from 1:4 to 1:2. As the brazing material put between the outer pipe and the inner pipe, those composed of copper, brass, solder or like other material having melting point lower than that of the pipe materials may properly be used depending on the material of the pipes. The brazing material is put between the inner and the outer pipes by coating by means of plating such as electric plating, electroless plating or dip plating, as well as in the form of an extremely thin sheet-like brazing material.

Upon manufacturing a double pipe by using the pipe materials and the brazing materials as described above, the inner pipe is tightly fit into the outer pipe while putting the brazing material therebetween and, thereafter, usual drawing fabrication is applied by using a die and a plug to reduce the diameter into a double pipe of a predetermined pipe diameter. The drawing fabrication is preferably conducted in a heated or hot state.

Heat treatment for the double pipe molded into a predetermined pipe diameter is applied at a temperature higher than the melting point of the brazing material used, so that the brazing material is completely melted.

Then, the conditions for the subsequent cooling treatment is determined depending on the combination of the pipe materials used. For instance, in the combination of low carbon steel and high carbon steel, the treatment is preferably conducted at a cooling rate of less than 20° C./min. If the cooling rate is too rapid, temperature difference between the inner pipe and the outer pipe is increased to lower the temperature for starting the occurrence of the compressive stress in the inner pipe along with the shrinkage of the outer pipe to reduce the aimed effect. Thus, it is desirable to reduce the cooling rate.

When a double pipe prepared by tightly fitting the inner pipe and the outer pipe by means of the brazing material is applied with the heat treatment, a gap between the inner and the outer pipe tightly fit to each other by means of the brazing material is slightly increased due to the difference in the expansion between the outer pipe and the inner pipe caused by the difference of the thermal expansion coefficient, and the brazing material is melted and extended in the gap. Then, when the pipe is applied with the gradual cooling treatment, the brazing material is at first coagulated to braze the inner and the outer pipes to each other and as the temperature lowers further, shrinkage proceeds both in the inner and the outer pipes. Since the outer pipe causes greater shrinkage than the inner pipe, the outer pipe tightens the inner pipe to form a double pipe in which a compressive stress is left in the inner pipe and the value of the stress reaches maximum, particularly, at the inner surface thereof. Generally, the stress due to the inner pressure (tensile stress) reaches maximum at the inner surface of the pipe and the stress is concentrated to notched defects which are liable to be formed at the inner surface, in particular, of a small diameter pipe during production process thereby liable to cause destruction. However, in the double pipe according to the present invention, the foregoing problem can be prevented by the compressive stress applied to the inner surface.

EXAMPLE

Figure 1:
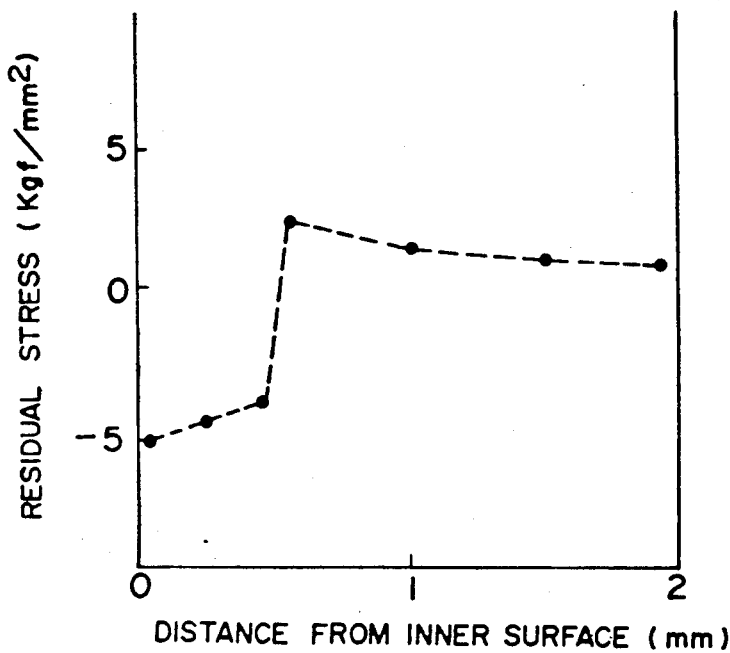
FIG. 1 is a graph illustrating a residual stress distribution in the product according to the present invention, while taking the distance from the inner surface (mm) on the abscissa and the residual stress (kgf/mm$^2$) on the ordinate

The present invention will now be described referring to examples.

Example

A carbon steel pipe of 0.1% carbon content having 9.5 mm outer diameter and 6.1 mm inner diameter (STS 35, heat expansion coefficient: 11.5×10$^{-6}$/°C.) was used as an outer pipe 12, while a carbon steel pipe 14 of 0.4% carbon content having 5.5 mm outer diameter and 4.3 mm inner diameter (STKM 16A, thermal expansion coefficient: 1.75×10$^{-6}$/°C.) and applied at the outer surface 16 with electric copper plating 18 to a thickness of 6 um was used as an inner pipe 20. The inner pipe 20 was inserted into the outer pipe 12 and a double pipe 22 having 6 mm outer diameter and 2 mm inner diameter was formed by reducing the diameter by applying drawing fabrication using a die and a plug. Subsequently, the double pipe 22 was applied with a heat treatment at 1120° C. for 10 min in an electric furnace containing a non-oxidative atmosphere and then applied with a gradual cooling treatment to a room temperature at a cooling rate of 20° C./min to manufacture a double pipe product 22 comprising inner and outer pipes 20 and 12 completely joined and tightly fit to each other.

Figure 2:
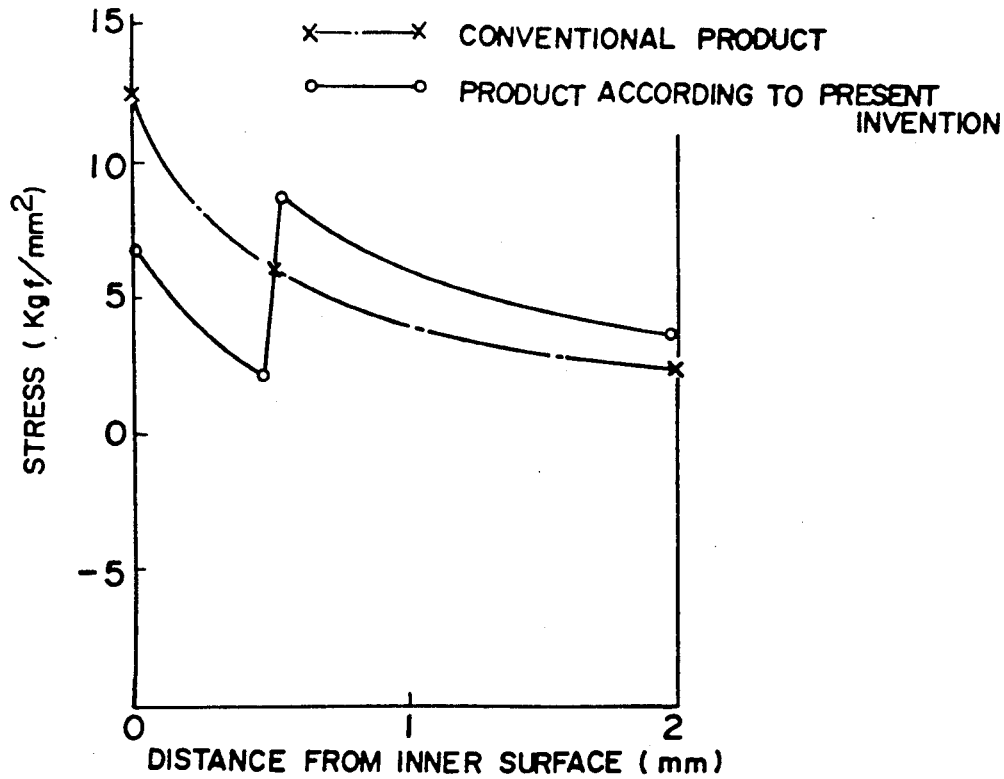
FIG. 2 is a graph illustrating a theoretical value of a stress distribution calculated upon applying 1000 kgf/cm$^2$ of inner pressure, while taking the distance from the inner surface (mm) on the abscissa and the stress (kgf/mm$^2$) on the ordinate.
Figure 3:
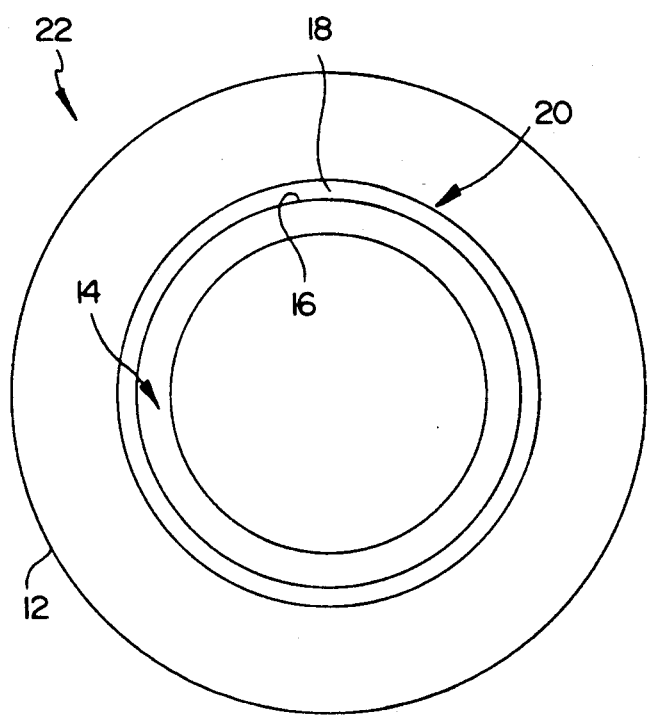
FIG. 3 is an end view of a double pipe formed by the process of the subject invention.

For the resultant double wall pipe product 22, the residual stress was measured by X-ray diffractiometry. FIG. 1 shows the distribution state. Further, FIG. 2 shows the theoretical value of the stress distribution in each portion of the pipe wall by the calculation when an inner pressure of 1000 kgf/cm$^2$ was applied. Further, when static rupture pressure was measured by a hydraulic pressure-proof tester, the results was 4430 kgf/cm$^2$.

Comparative Example

The static rupture pressure was measured for a STS 35 steel pipe with 6 mm outer diameter and 2 mm inner diameter in the same manner as in Example 1. As a result, the rupture pressure was 3700 kgf/cm$^2$ and the theoretical value of the stress distribution in each portion of the pipe wall by the calculation when applying 1000 kgf/cm$^2$ of the inner pressure to the inner surface of the pipe is shown in FIG. 2.

According to the present invention, since a double pipe 22 is prepared by tightly fitting an outer pipe and an inner pipe 20 while putting a brazing material 18 therebetween, the material for the outer pipe 12 having a heat expansion coefficient greater than that of the inner pipe 20 and the double pipe 22 was applied with a heat treatment and then with a gradual cooling treatment, a compressive residual stress can be provided to the inner surface with no particular additional step, so that remarkable effects can be obtained, for example, a pipe 22 having great resistivity to high inner pressure can be obtained by properly selecting the combination for the materials of the outer and the inner pipes 12 and 20 and the brazing material 18, the stress in the inner surface to the inner pressure can be kept low as compared with usual pipes, the maximum stress can be formed at the inside of the pipe wall with less defects and thus the rupture strength, in particular, fatigue strength to the repeated inner pressure can remarkably be improved.

What is claimed is:

1. A method of manufacturing a high pressure fluid supply pipe comprising:
   providing an outer pipe having a selected inner diameter and a selected thermal expansion coefficient;
   providing an inner pipe having an inner surface and an opposed outer surface defining an outer diameter less than the inner diameter of the outer pipe, the inner pipe having a thermal expansion coefficient less than the thermal expansion coefficient of the outer pipe; the inner pipe and the outer pipe each defining wall thicknesses with a ratio of the wall thicknesses between the inner and outer pipe being in a range of from 1:4 to 1:2;
   providing a brazing material;
   inserting the inner pipe into the outer pipe with the brazing material disposed therebetween;

tightly fitting the inner and outer pipes to the brazing material by means of a drawing fabrication to form a double pipe;

heating the double pipe sufficiently to melt the brazing material; and gradually cooling the double pipe such that the outer pipe thereof contracts into tight fitting engagement with the inner pipe and provides at least the inner surface of the inner pipe with a compressive residual stress.

2. A manufacturing method as defined in claim 1, wherein the melting temperature of the brazing material is lower than that of the inner pipe and the outer pipe.

3. A manufacturing method as defined in claim 1, wherein the brazing is disposed by means of plating.

4. A manufacturing method as defined in claim 1, wherein the drawing fabrication is conducted in a heated or hot state.

5. A manufacturing method as defined in claim 1, wherein the gradual cooling treatment is conducted at a cooling rate of less than 20° C./min.

6. A manufacturing method as defined in claim 1, wherein the brazing material defines a thin sheet applied to the inner pipe prior to inserting the inner pipe into the outer pipe.

7. A manufacturing method as defined in claim 1, wherein the drawing fabrication is carried out with a die and a plug.

8. A manufacturing method as defined in claim 1, wherein the heating is carried out at about 1120° C. for about 10 minutes.

* * * * *